United States Patent [19]

Bouchez et al.

[11] Patent Number: 6,077,565
[45] Date of Patent: Jun. 20, 2000

[54] COLORED BITUMINOUS MATERIALS A METHOD OF OBTAINING THEM AND A COLORING COMPOSITION FOR CARRYING OUT THE METHOD

[75] Inventors: Alain Bouchez, Vincennes; Dominique Capitaine, Rosay sur Lieure, both of France

[73] Assignee: Onduline, Paris, France

[21] Appl. No.: 09/187,755

[22] Filed: Nov. 9, 1998

[30] Foreign Application Priority Data

Nov. 7, 1997 [FR] France ................................. 97 14063

[51] Int. Cl.$^7$ ................................. B05D 1/38; B05D 3/02
[52] U.S. Cl. ........................................ 427/412; 427/412.2
[58] Field of Search ................................. 427/412, 412.2

[56] References Cited

U.S. PATENT DOCUMENTS 5,206,068  4/1993  Kalkanoglu .............................. 428/143

FOREIGN PATENT DOCUMENTS

| 2 323 435 | 4/1977 | France . |
| 2 352 929 | 12/1977 | France . |
| 80005 | 2/1971 | Germany . |
| 36 41 677 | 6/1988 | Germany . |

*Primary Examiner*—Erma Cameron
*Attorney, Agent, or Firm*—Young & Thompson

[57] ABSTRACT

The invention consists of a method of obtaining colored bituminous materials consisting of:

applying onto at least one surface of the material to be treated, an aqueous coloring composition based on pigments and resin with a restricted range of solubility, drying the material coated with the coloring composition then impregnating it with bitumen.

9 Claims, No Drawings

COLORED BITUMINOUS MATERIALS A METHOD OF OBTAINING THEM AND A COLORING COMPOSITION FOR CARRYING OUT THE METHOD

FIELD OF THE INVENTION

The invention relates to coloured or pigmented bituminous materials, notably used as covering, siding or sealing materials.

BACKGROUND OF THE INVENTION

A method for the colouring or the pigmenting of bituminous materials has already been described in French Patent No. 2 352 929.

It consists of applying a colouring composition onto a fibrous material, then drying the composition and then impregnating the fibrous material coated in this way, in a bath of hot bitumen.

The colouring composition has a high water content and comprises resin, pigments, a thickening agent, a dispersing agent and possibly fillers.

This method allows one to obtain coloured bituminous materials whose resistance to ageing is better than that observed with materials obtained by known methods.

However, it is apparent that it is necessary to further improve the resistance to ageing of coloured bituminous materials in order to prevent their degradation, including even under extreme climatic conditions.

SUMMARY OF THE INVENTION

Firstly the invention relates to a new composition based on resin and pigments, for obtaining coloured bituminous materials.

The resin used has the particular property of having a restricted range of solubility.

The colouring composition is prepared by carrying out the following successive steps:

Firstly, the resin is dissolved in water and within its range of solubility. The percentages by weight of resin and of water in the mixture obtained are between about 30 and 70% of resin and 30 and 70% of water. The mixture obtained is clear.

The additive that enables one to obtain a stable dispersion, is added to the mixture. The quantity of additive is between about 0.5 and 3% of the weight of the resin.

The additive is a surfactant, the molecule of which includes a chain with hydrophilic character and a chain with hydrophobic character. It is an amphiphilic type of product.

Then water is added to the mixture in solution in sufficient quantity to cause the resin to precipitate. In effect, because of the addition of the water, the resin is no longer within its range of solubility.

The additive allows the dispersion of the resin in the water to be stabilised, and when the water is added to the mixture prevents the settling and the agglomeration of the precipitated particles of resin which would end up in a gel.

Finally, pigments are introduced into the mixture to obtain the colouring composition according to the invention. The pigments are in powder form with a particle size of between 0.5 and 50 µm. They are of an organic or a mineral type.

The quantity of pigments is between 50 and 150% of the weight of the resin.

The colouring composition according to the invention therefore has:

between about 5 to 20% and preferably 15% by weight of a resin with a restricted solubility range between about 5 to 40% and preferably 20% by weight of pigments, between about 0.1 to 5% and preferably 1% by weight of an additive with respectively hydrophilic and hydrophobic properties, between about 90 to 60% and preferably 64% by weight of water.

The invention also relates to a method of obtaining coloured or pigmented bituminous materials.

This method consists first of all of applying, onto at least one surface of the fibrous material to be treated, the colouring composition that has just been described.

The fibrous material is notably a cellulose based felt or a board. It can be in the dry state or may include water in an amount ranging up to 60% by weight.

The composition can be applied notably by spraying with or without compressed air, by coating the surface using at least one transfer roller (made of foam for example) or by the deposition of a very thin film.

The thickness of the layer obtained corresponds to a coating weight of dry material between about 25 to 130 g/m$^2$.

Within this range of values, the thickness of the layer of colouring composition is sufficient to colour the substrate and remains thin enough to allow subsequent penetration of the bitumen into the fibrous material.

The coloured fibrous material is then dried, notably by simple drying in air. It is finally subjected to a bitumen impregnation operation, the layer of colouring composition undergoing curing at high temperature, within the mass of hot bitumen.

The bituminous material obtained has colouring on its surface. Tests carried out have shown that this colouring has better appearance and resistance compared with that provided using traditional colouring methods.

DETAILED DESCRIPTION OF THE INVENTION

The invention will be better understood on reading the examples of its implementation that will now be described.

EXAMPLE 1

A colouring composition is prepared according to the invention, from a resin sold under the name of LAMAL® 141 S by the company LAMAL and which is in the form of a powder with 100% dry material.

This resin is dissolved in water at ambient temperature and in equal proportions (50% by weight of resin and 50 by weight of water). The solution obtained is clear.

An additive of the type TEGOPREN® 5852H, sold by the company GOLDSCHMIT is added to the mixture in an amount corresponding to about 2.5% of the weight of the resin. Then a quantity of water corresponding to 30% by weight of the mixture is added. The resin precipitates and a milky solution of resin finely dispersed in water is obtained.

The pigments, in the form of a brown pigment paste sold by the company HOLIDAY Dispersion are firmly added to the solution at the rate of 20%.

The colouring composition is applied onto one surface of a fibrous material comprising 0 to 70% of water and then this is dried in the free air.

It was observed that rubbing the coloured surface of the fibrous material (notably with the finger) revealed no trace of pigment whatsoever.

EXAMPLE 2

A colouring composition according to the invention is prepared from a resin sold under the name LAMELITE® by the company AGROLINZ MELAMIN ITALIA and which is in the form of a powder.

This resin has a solubility in water between 30 and 65% at a temperature of 25° C.

It is dissolved in the water in the following proportions: about 40% by weight of resin for 60% by weight of water.

An additive, sold under the name of TEGOPREN® 5852, is added to the mixture in the quantity corresponding to about 4% by weight of the resin.

Water is then added to the mixture, in an amount corresponding to at least 40% by weight of the mixture.

The pigments are finally incorporated into the mixture in the proportion of 50% (pigments/mixture, by weight). The pigments are in paste form with about a 60% pigment content. The pigment is an ochre iron oxide paste, sold under the name ASTRA® AGR 301.

The colouring composition is applied onto one surface of a fibrous material that includes 0 to 70% of water and this is then dried in the free air.

As was the case with the colouring composition conforming to Example 1, on rubbing the coloured surface of the fibrous material, no trace of pigment appeared.

The two examples of a colouring composition according to the invention will now be compared with a colouring composition produced from a resin that is totally soluble in water in all proportions.

This comparative colouring composition is produced from a resin sold under the name of URECOLL MKS by the company BASF.

It is in the form of an aqueous solution comprising 70% by weight of dry materials.

This resin is dissolved in water to provide a solution containing about 20% of resin.

Pigments are incorporated into the mixture at the rate of about 130% of the weight of the resin.

This colouring composition is then applied onto one surface of the fibrous material that was also used in the examples according to the invention and this is dried in the free air.

It is observed that, on rubbing the coloured surface of the material with the finger, this is coloured with pigment. Furthermore, if the material is dried by a forced air dryer, this also causes loss of grains of pigment from the coloured surface of the material.

The comparison between Examples 1 and 2 and the colouring composition based on URECOLL® shows that it is essential to use a resin with reduced solubility in water in order to improve the holding of the pigments on the fibrous material.

The following explanations can be put forward without them being either exhaustive or definitive.

With the colouring composition according to the invention, a large proportion of the resin envelops the pigments and is not dissolved in the water. For Example 1, it is observed, for example, that only 20% by weight of the resin is dissolved.

Hence, a large proportion of resin remains on the surface of the fibrous material which has been coated with a layer of colouring composition and this allows the pigments to be attached to the material.

Contrary to this, when a colouring composition based on URECELL® is applied, whatever the respective proportions of resin and water, the resin will difffuse into the fibrous material and the pigments will not be fixed to the material.

Ageing tests have also been carried out on fibrous materials coated with the colouring composition conforming to Example 1 and impregnated with bitumen and on fibrous materials coated with the comparative colouring composition based on URECOLL® resin and impregnated with bitumen.

The tests consisted of spraying water at a temperature of 35° C. in accordance with the following steps:
  3 weeks of spraying, day and night
  2 weeks of alternating conditions: exposure to the sun during the day and spraying at night.
  3 weeks of no spraying: exposure to the sun and
  finally 4 weeks of alternating conditions: exposure to the sun during the day and spraying at night.

Examination of the materials after these tests shows that the discoloration of the materials coloured with the comparative colouring composition is greater than that of the materials coloured with the composition of Example 1.

It is also desirable to make the bituminous material more rigid in order to make it more resistant to bowing or sagging.

To do this, it is known to incorporate into the fibrous material, before impregnation with the bitumen, a resin at an amount ranging up to 4 to 5% (indeed 10%) by weight of resin with respect to the weight of the dry material.

One may make reference to French Patent No. 2 466 489 which describes a process of this type.

At the time of the incorporation of the resin, the fibrous material includes from 0 to 70% water.

After the application of the resin, the material is dried, then impregnated with bitumen, in accordance with the usual methods.

The resin is incorporated onto the surface of the fibrous material opposite to that which is or which will be coated with a colouring composition according to the invention.

The quantity of resin which is used in this process is relatively large.

However, it is apparent that by choosing a particular resin, the quantity of resin can be considerably reduced, while improving the resistance to bowing or sagging of the bituminous material.

The resin which is used in this case is a resin that is totally soluble in water in all proportions.

With such a resin, it is sufficient to incorporate into the fibrous material, a quantity of resin which is 2% by weight with respect to the weight of dry material. The maximum quantity of resin will be 10% by weight with respect to the weight of dry material.

By way of example, the previously described resin URECOLL®, can be used.

Tests have demonstrated that a quantity of resin 2% by weight with respect to the weight of dry material, improves the resistance to deformation of the bituminous material in a damp environment by 50%.

Quite clearly, by incorporating more resin, the resistance will be even more improved.

Contrary to this, if an undissolved resin is incorporated into the fibrous material, no improvement in the resistance to deformation is observed.

By way of an example, this is notably the case for the resin LAMAL® 141S, previously described, diluted to 20% in water (that is to say, outside its solubility range) and used at the same quantity of 2% by weight with respect to the weight of fibrous material.

The dissolution of the resin in water is therefore essential so that the resin difffuses throughout the thickness of fibrous material. In the contrary case, the solid particles of resin are filtered by the material and remain on its surface without penetrating.

Hence, onto one and the same fibrous material, a colouring composition according to the invention can be applied onto one face and a resin diluted with water onto the other face, this latter resin being totally soluble in water in all proportions, and the quantity of resin used may also be as low as 2% by weight with respect to the weight of the dry fibrous material.

This fibrous material is then dried and impregnated with bitumen.

The bituminous material obtained has colour holding properties and resistance to bowing or sagging in a damp environment which are considerably improved.

What is claimed is:

1. A method of preparing a colouring composition which comprises the following successive steps:

dissolving a first resin in water within its restricted range of solubility in proportions by weight of between about 30 and 70% of resin and 30 to 70% of water so as to obtain a mixture;

adding to the mixture, an additive having both a hydrophilic and a hydrophobic character, at a rate of between 0.5 and 3% by weight of the resin;

adding water in sufficient quantity to cause the first resin to precipitate; and adding pigments in powder form and at a rate of between 50 and 150% by weight of the resin in order to obtain the colouring composition.

2. The method according to claim 1, wherein the additive is a surfactant whose molecule includes a chain of hydrophilic character and a chain of hydrophobic character.

3. The method according to claim 1, wherein the pigments have a particle size ranging between 0.5 and 50 $\mu$m.

4. A method of obtaining a coloured bituminous material, which comprises:

applying onto at least one face of a material to be treated, a coating of the colouring composition obtained according to the method of claim 1, so as to obtain a material coated with the colouring composition;

drying the material coated with the colouring composition so as to obtain a dried coated material; and impregnating the dried coated material with bitumen.

5. The method according to claim 4, wherein the material is a cellulose based felt or a board.

6. The method according to claim 4, wherein the coating of the colouring composition has a coating weight of dry material ranging between about 25 and 130 g/m$^2$.

7. The method according to claim 4, further comprising applying onto a face of the material that is not coated with the colouring composition, an aqueous solution of a second resin.

8. The method according to claim 7, wherein said second resin is totally soluble in water in all proportions.

9. The method according to claim 7, wherein the second resin is applied in an amount ranging between 2 and 10% by weight with respect to the weight of dry material.

* * * * *